US012787073B2

(12) United States Patent
Amiri et al.

(10) Patent No.: US 12,787,073 B2
(45) **Date of Patent: *Nov. 3, 2026**

(54) CLIENT STEERING FOR A WIRELESS LOCAL AREA NETWORK

(71) Applicant: Quantefi Corporation, Detroit, MI (US)

(72) Inventors: Bahador Amiri, Saratoga, CA (US); Debashis Dash, Newark, CA (US)

(73) Assignee: Quantefi Corporation, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/296,703

(22) Filed: Apr. 6, 2023

(65) Prior Publication Data

US 2023/0247690 A1 Aug. 3, 2023

Related U.S. Application Data

(63) Continuation of application No. 17/336,053, filed on Jun. 1, 2021, now Pat. No. 11,743,952, which is a continuation of application No. 16/444,945, filed on Jun. 18, 2019, now Pat. No. 11,039,487, which is a continuation of application No. 15/409,527, filed on Jan. 18, 2017, now Pat. No. 10,342,052.

(60) Provisional application No. 62/279,883, filed on Jan. 18, 2016.

(51) Int. Cl.

| | |
|---|---|
| ***H04W 76/10*** | (2018.01) |
| ***H04W 4/02*** | (2018.01) |
| *H04W 4/029* | (2018.01) |
| *H04W 84/12* | (2009.01) |

(52) U.S. Cl.
CPC ........... *H04W 76/10* (2018.02); *H04W 4/023* (2013.01); *H04W 4/029* (2018.02); *H04W 84/12* (2013.01)

(58) Field of Classification Search
CPC ..... H04W 76/10; H04W 4/023; H04W 4/029; H04W 84/12
USPC .............. 370/310, 328, 338; 455/403, 422.1, 455/456.1
See application file for complete search history.

(56) References Cited

U.S. PATENT DOCUMENTS

| | | | |
|---|---|---|---|
| 10,342,052 | B1 | 7/2019 | Amiri et al. |
| 11,039,487 | B2 | 6/2021 | Amiri et al. |
| 11,743,952 | B2 | 8/2023 | Amiri et al. |
| 2006/0227744 | A1 | 10/2006 | Metke et al. |
| 2008/0186871 | A1 | 8/2008 | Trevino et al. |
| 2012/0184213 | A1 | 7/2012 | Onozawa |
| 2013/0231115 | A1 | 9/2013 | Lin |
| 2013/0300607 | A1 | 11/2013 | Mansour |
| 2014/0105003 | A1 | 4/2014 | Austin et al. |
| 2014/0148155 | A1 | 5/2014 | Batta et al. |

(Continued)

*Primary Examiner* — Obaidul Huq
(74) *Attorney, Agent, or Firm* — Buchalter; Jason W. Croft

(57) ABSTRACT

Systems and methods for a wireless device to determine whether to associate with a wireless access point in view of a historical location-based record to predict a probability for a future location state based on a historical dwell time of the historical location-based record. Some examples include a wireless device receiving information for a location with multiple access points, where the location has a plurality of rooms, and the information includes historical proximity records of wireless stations associated with each of the multiple access points, and current proximity metrics for at least one of the multiple access points.

20 Claims, 7 Drawing Sheets

Method for Client Steering

(56) References Cited

U.S. PATENT DOCUMENTS

| | | | | |
|---|---|---|---|---|
| 2015/0092676 | A1* | 4/2015 | Periyalwar | H04W 76/15 370/329 |
| 2015/0110087 | A1 | 4/2015 | Salkintzis et al. | |
| 2015/0350842 | A1 | 12/2015 | Huang et al. | |
| 2016/0100303 | A1 | 4/2016 | Kim et al. | |
| 2016/0380820 | A1 | 12/2016 | Horvitz et al. | |
| 2016/0381497 | A1* | 12/2016 | Wan | H04W 4/80 455/456.2 |
| 2016/0381612 | A1 | 12/2016 | Gao | |
| 2017/0082723 | A1 | 3/2017 | Pajovic et al. | |
| 2017/0194706 | A1* | 7/2017 | Lee | H04B 7/0619 |
| 2017/0195893 | A1 | 7/2017 | Lee et al. | |

* cited by examiner

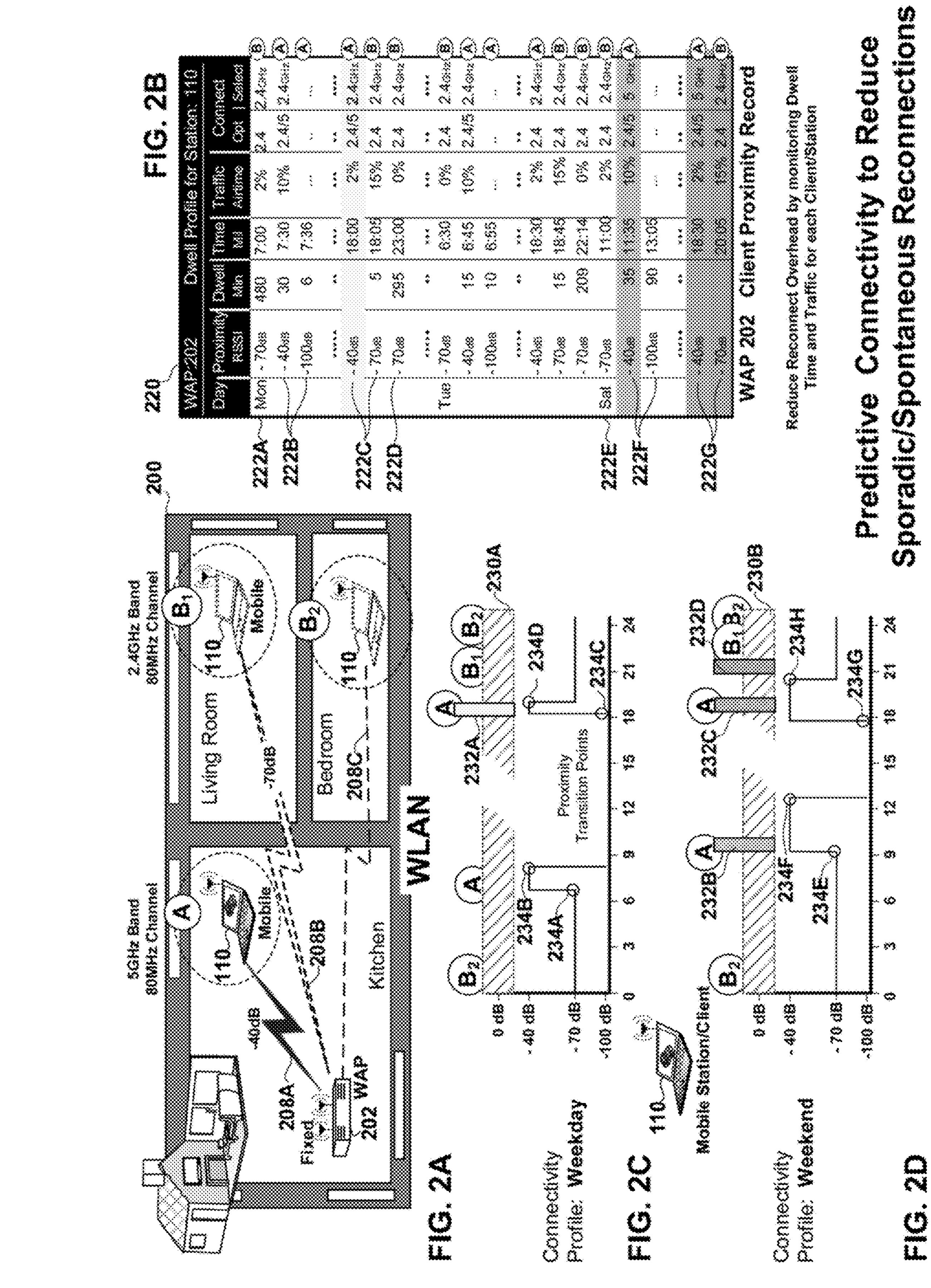
FIG. 2A
WLAN
200
5GHz Band 80MHz Channel
2.4GHz Band 80MHz Channel
Living Room
Bedroom
Kitchen
Fixed
Mobile
202 WAP
208A
208B
208C
-40dB
-70dB
110
FIG. 2B
220
WAP 202 Dwell Profile for Station: 110
Day
Proximity RSSI
Dwell Min
Time Mil
Traffic Airtime
Connect Opt | Select
222A
222B
222C
222D
222E
222F
222G
WAP 202 Client Proximity Record
Reduce Reconnect Overhead by monitoring Dwell Time and Traffic for each Client/Station
FIG. 2C
Connectivity Profile: Weekday
Proximity Transition Points
230A
232A
234A
234B
234C
234D
FIG. 2D
Connectivity Profile: Weekend
230B
232B
232C
232D
234E
234F
234G
234H
Mobile Station/Client
0 dB
-40 dB
-70 dB
-100 dB
Predictive Connectivity to Reduce Sporadic/Spontaneous Reconnections

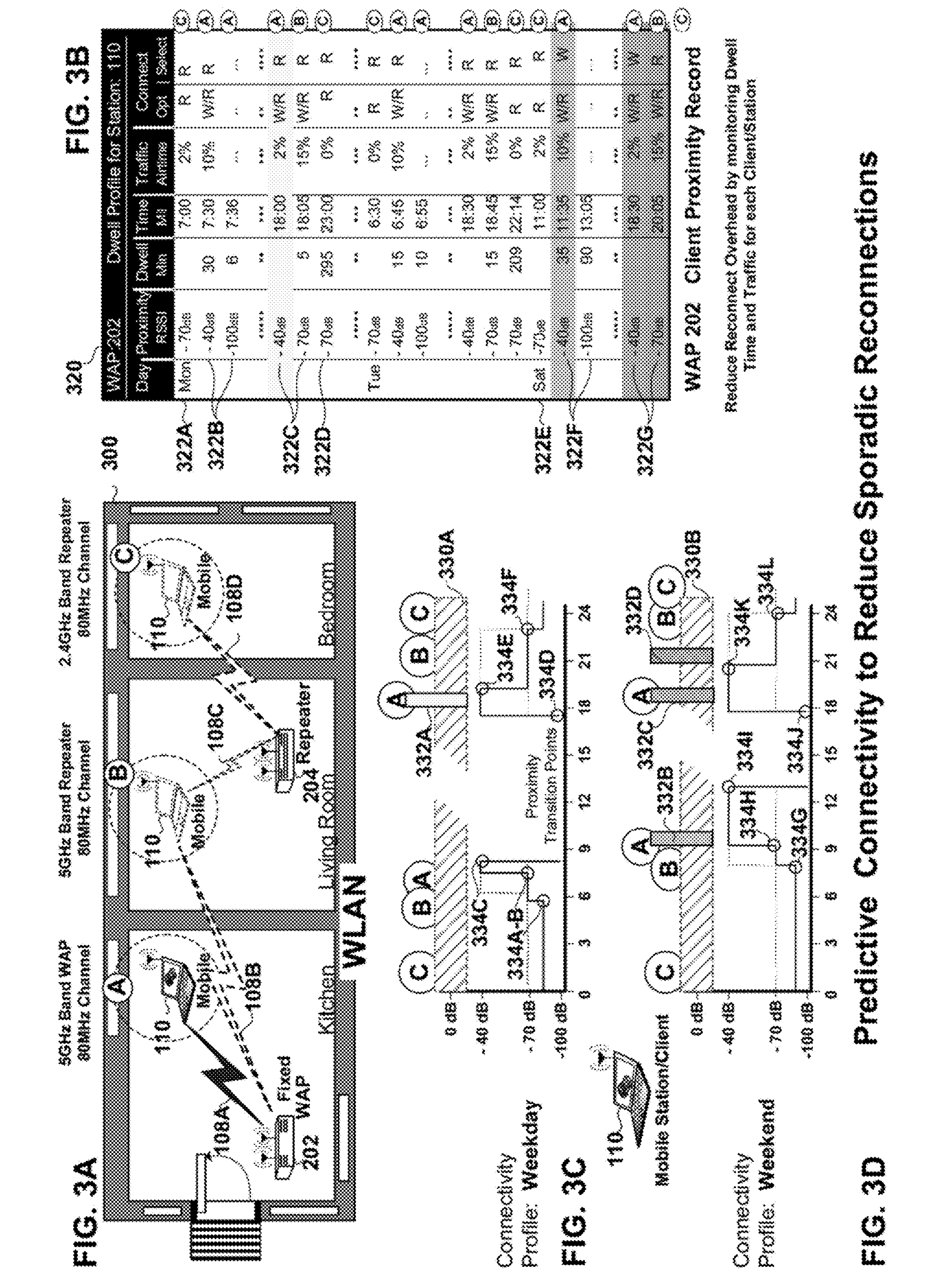
FIG. 3A
5GHz Band WAP
80MHz Channel
5GHz Band Repeater
80MHz Channel
2.4GHz Band Repeater
80MHz Channel
300
Fixed WAP
202
108A
108B
108C
108D
110
Mobile
Kitchen
Living Room
Bedroom
204 Repeater
WLAN
FIG. 3B
320
WAP 202 Dwell Profile for Station: 110
WAP 202 Client Proximity Record
Reduce Reconnect Overhead by monitoring Dwell Time and Traffic for each Client/Station
322A
322B
322C
322D
322E
322F
322G
Connectivity Profile: Weekday
FIG. 3C
330A
332A
334A-B
334C
334D
334E
334F
Proximity Transition Points
110
Mobile Station/Client
Connectivity Profile: Weekend
330B
332B
332C
332D
334G
334H
334I
334J
334K
334L
FIG. 3D
Predictive Connectivity to Reduce Sporadic Reconnections

Method for Client Steering

CLIENT STEERING FOR A WIRELESS LOCAL AREA NETWORK

CROSS REFERENCE TO RELATED APPLICATIONS

This application claims the benefit as a continuation of prior filed co-pending U.S. application Ser. No. 16/444,945 filed on Jun. 18, 2019 entitled "Client Steering for a Wireless Local Area Network" which claims priority to prior filed U.S. application Ser. No. 15/409,527 filed on Jan. 18, 2017 entitled "Client Steering for a Wireless Local Area Network" which claims priority to prior filed U.S. Provisional Application No. 62/279,883 filed on Jan. 18, 2016 entitled "Cloud Client Steering" which are incorporated herein by reference in their entirety as if fully set forth herein.

BACKGROUND OF THE INVENTION

1. Field of Invention

The field of the present invention relates in general to wireless local area networks including wireless access points (WAP) and wireless stations and steering methods therefore.

2. Description of the Related Art

Home and office networks, a.k.a. wireless local area networks (WLAN) are established using a device called a Wireless Access Point (WAP). The WAP may include a router. The WAP wirelessly couples all the devices of the home network, e.g. wireless stations such as: computers, printers, televisions, digital video (DVD) players, security cameras and smoke detectors to one another and to the Cable or Subscriber Line through which Internet, video, and television is delivered to the home. Most WAPs implement the IEEE 802.11 standard which is a contention based standard for handling communications among multiple competing devices for a shared wireless communication medium on a selected one of a plurality of communication channels. The frequency range of each communication channel is specified in the corresponding one of the IEEE 802.11 protocols being implemented, e.g. "a", "b", "g", "n", "ac", "ad". Communications follow a hub and spoke model with a WAP at the hub and the spokes corresponding to the wireless links to each 'client' device.

After selection of a single communication channel for the associated home network, access to the shared communication channel relies on a multiple access methodology identified as Carrier Sense Multiple Access (CSMA). CSMA is a distributed random access methodology for sharing a single communication medium, by having a contending communication link back off and retry access a prospective collision on the wireless medium is detected, i.e. if the wireless medium is in use.

Communications on the single communication medium are identified as "simplex" meaning, one communication stream from a single source node to one or more target nodes at one time, with all remaining nodes capable of "listening" to the subject transmission. Starting with the IEEE 802.11ac standard and specifically 'Wave 2' thereof, discrete communications to more than one target node at the same time may take place using what is called Multi-User (MU) multiple-input multiple-output (MIMO) capability of the WAP. MU capabilities were added to the standard to enable the WAP to communicate with multiple single antenna single stream devices concurrently, thereby increasing the time available for discrete MIMO video links to wireless HDTVs, computers tablets and other high throughput wireless devices the communication capabilities of which rival those of the WAP. The IEEE 802.11ax standard integrates orthogonal frequency division multiple access (OFDMA) into the WAP or stations capabilities. OFDMA allows a WAP to communicate concurrently on a downlink with multiple stations, on discrete frequency ranges, identified as resource units.

Increasingly dense deployments of WAP's and stations make new demands on the wireless local area network (WLAN). What is needed are improved methods for wireless communication between the WAP and its associated stations on the WLAN.

SUMMARY OF THE INVENTION

The present invention provides a method and apparatus for a wireless access point (WAP), individually or collectively with other WAPs to enhance wireless operations and in particular client steering.

In an embodiment of the invention a wireless access point (WAP) is configured to support wireless communications with associated stations on at least one selected wireless communication channel on a wireless local area network (WLAN). The WAP includes a plurality of transmit and receive components, a non-volatile memory, a proximity circuit, a connectivity circuit, and a prediction circuit. The plurality of components couple to one another to form transmit and receive paths for processing wireless communications on the at least one selected wireless communication channel. The non-volatile memory accumulates historical records of each station's proximity to the WAP including transitions in proximity over time along with corresponding connectivity options before and after each transition. The proximity circuit detects a transition in proximity to the WAP of an identified station. The connectivity circuit determines current connectivity options for communicating with the station identified by the proximity circuit. The prediction circuit couples to the plurality of components, and correlates the accumulated historical records for the identified station which match the identified station's current proximity to the WAP with remaining historical records for the identified station to determine which of the remaining records exhibits the highest probability of predicting the identified station's subsequent proximity, and the predicted connectivity options associated therewith; and the prediction circuit selects connectivity options for the plurality of components to establish a communication link with the identified station utilizing a selected one of the predicted connectivity options, rather than the current connectivity options determined by the connectivity circuit, when the corresponding probability identified therefore, exceeds a threshold level.

The invention may be implemented in hardware, firmware, circuits or software.

Associated methods are also claimed.

BRIEF DESCRIPTION OF THE DRAWINGS

These and other features and advantages of the present invention will become more apparent to those skilled in the art from the following detailed description in conjunction with the appended drawings in which:

FIGS. 2A-D are respectively a system view, a data structure diagram, and a pair of signal graphs, in which which wireless connectivity determinations are made in accordance with an embodiment of the current invention.

FIGS. 3A-D are respectively a system view, a data structure diagram, and a pair of signal graphs, in which which wireless connectivity determinations are made in accordance with an alternative embodiment of the current invention.

DETAILED DESCRIPTION OF THE EMBODIMENTS

Figure 1A:
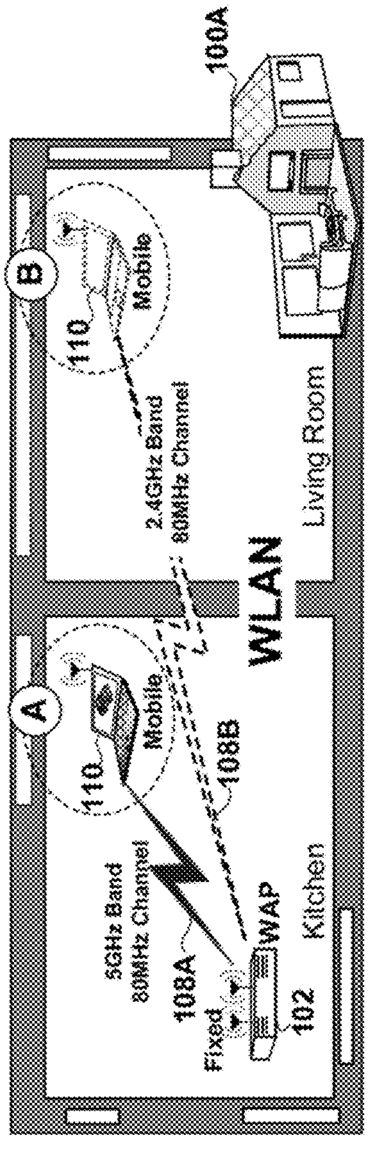
FIGS. 1A-C are respectively system views and a proximity graph of a home with a prior art wireless local area networks (WLAN) in which wireless connectivity determinations are made in accordance with prior art practices.
Figure 1C:
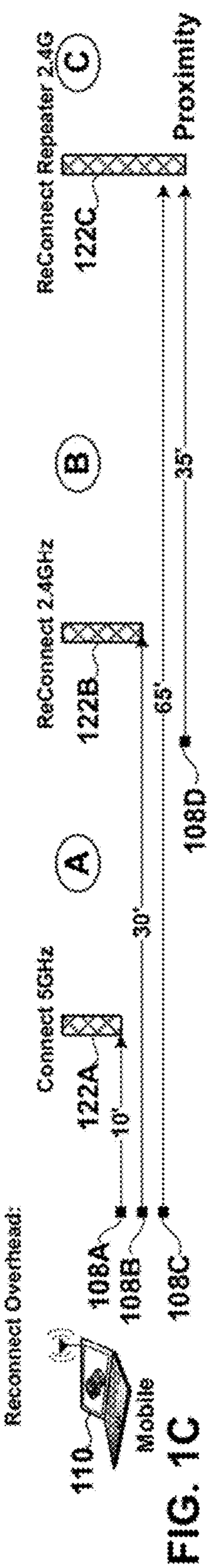
Figure 1B:
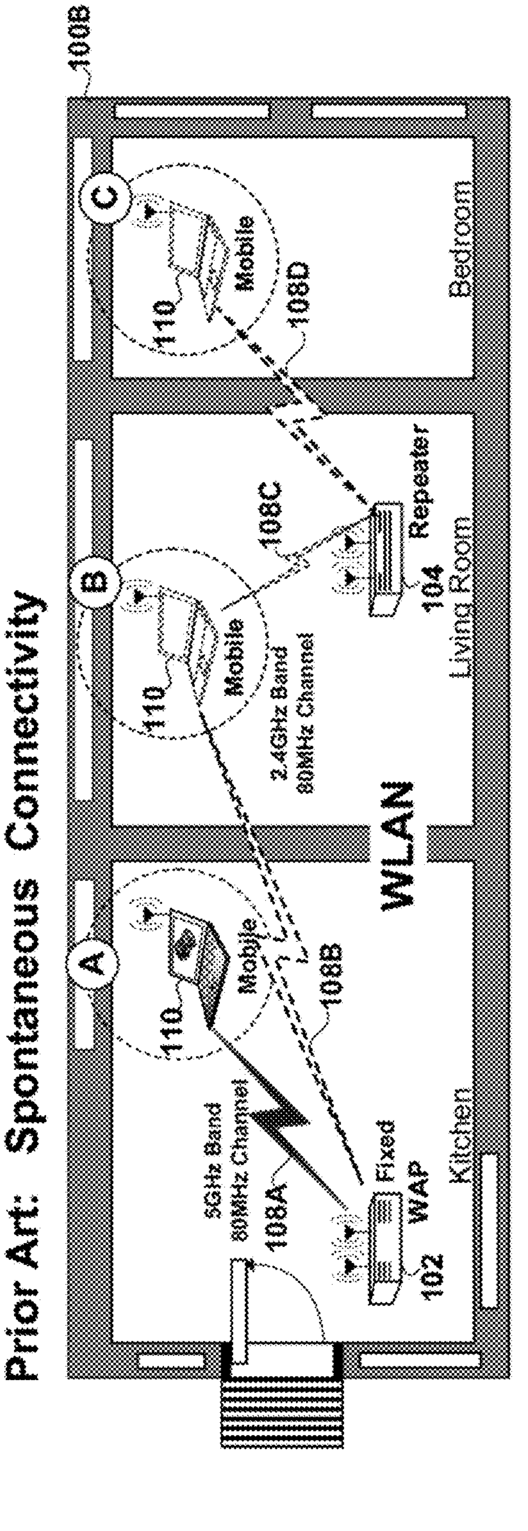

FIGS. 1A-C are respectively system views and a proximity graph of a home with a prior art wireless local area networks (WLAN) in which wireless connectivity determinations are made in accordance with prior art practices.

FIG. 1A is a plan view of a home 100A in which a wireless access point (WAP) 102 and an associated station 110 are shown. When the station 110 is near to the WAP in the kitchen at location A the WAP uses the higher throughput 5 GHz band and an 80 MHz communication channel to establish a communication link 108A with the mobile station. When the station 110 moves to the living room to location B, distant from the WAP, the WAP uses the longer reach of the 2.4 GHz band and an 80 MHz communication channel to establish a communication link 108B with the mobile station 110. The change in communication band requires additional overhead in which all communications on the corresponding wireless local area network (WLAN) are interrupted until the band change is signaled by the WAP to the station(s).

FIG. 1B is a plan view of a home 100B in which the WAP 102 and associated station 110 are shown. When the station 110 is near to the WAP in the kitchen at location A the WAP uses the higher throughput 5 GHz band and an 80 MHz communication channel to establish a communication link 108A with the mobile station. When the station 110 moves to the living room, at location B distant from the WAP, the WAP uses the longer reach of the 2.4 GHz band and an 80 MHz communication channel to establish a communication link 108B with the mobile station 110. Alternately, the mobile station at location B may establish a communication link 108C directly with the the repeater 104. When the station 110 moves to the bedroom room, at location C more distant from the WAP, the WAP may no longer have the reach to communicate with the station so the station established a communication link 108D directly with the repeator 104. The change in communication band or change in association between WAP and repeator requires still more additional overhead in which all communications on the corresponding wireless local area network (WLAN) are interrupted until the band change or association change is effectuated on the WLAN.

FIG. 1C is a proximity graph for mobile station 110 showing the reconnection overhead 122A-C associated with establishing links 108A-D.

FIGS. 2A-D are respectively a system view, a data structure diagram, and a pair of signal graphs, in which which wireless connectivity determinations are made in accordance with an embodiment of the current invention.

FIG. 2A shows home 200 in plan view with a WLAN formed by WAP 202 and mobile station 110. Communication links 208A-C between the WAP and the station 110 at each of locations A, B1 and B2 are shown.

FIG. 2B is a signal graph showing a solid staircase line corresponding with the RSSI of the mobile station as measured by the WAP 202 at different times of day, during the weekdays as well as network activity 230A and network overhead 232A and the proximity transition points in measured RSSI 234A-D as the station moves through the home. Because of the limited use of the kitchen during weekdays as indicated in the corresponding historical proximity records for the mobile station as shown in FIG. 2B and specifically in proximity table 220 at rows 222A-D only one of the proximity transitions 234A-D results in a corresponding spike in WLAN overhead at 6 μm, civilian time, in the evening when the homeowner enters the home. This contrasts with the prior art case in which multiple spontaneous connectivity transitions would be expected.

FIG. 2C is a signal graph showing a solid staircase line corresponding with the RSSI of the mobile station as measured by the WAP 202 at different times of day, during the weekends as well as network activity 230B and network overhead 232B-D and the proximity transition points in measured RSSI 234E-G as the station moves through the home on the weekend. Because of the extended dwell time of the homeowner in the kitchen on weekends as indicated in the corresponding historical proximity records for the mobile station as shown in proximity table 220 in FIG. 2B at rows 222E-G multiple spikes in overhead at three of the four proximity transitions 234E-H are required to accommodate the homeowner's communication requirements.

FIGS. 3A-D are respectively a system view, a data structure diagram, and a pair of signal graphs, in which which wireless connectivity determinations are made in accordance with an alternative embodiment of the current invention.

FIG. 3A shows home 300 in plan view with a WLAN formed by WAP 202 and mobile station 110. Communication links 108A-D between the WAP or the repeater 204 and the station 110 at each of locations A, B and C are shown.

FIG. 3CB is a signal graph showing a solid staircase line corresponding with the RSSI of the mobile station as measured by the WAP 202 at different times of day, during the weekdays as well as network activity 330A and network overhead 332A and the proximity transition points in measured RSSI 334A-F as the station moves through the home. The dashed staircase line corresponds to the RSSI of the station 100 as seen by the repeater. Because of the limited use of the kitchen during weekdays as indicated in the corresponding historical proximity records for the mobile station as shown in FIG. 3B and specifically in proximity table 320 at rows 322A-D only one of the proximity transitions 334A-F results in a corresponding spike in WLAN overhead at 6 μm, civilian time, in the evening when the homeowner enters the home. This contrasts with the prior art case in which multiple spontaneous connectivity transitions would be expected. Weekday communication with the mobile station is handled by the repeator 204 which is close to the rooms in which the subscriber spends their weekday time.

FIG. 3C is a signal graph showing a solid staircase line corresponding with the RSSI of the mobile station as measured by the WAP 202 at different times of day, during the weekends as well as network activity 330B and network overhead 332B-D and the proximity transition points in measured RSSI 334G-L as the station moves through the home on the weekend. Because of the extended dwell time of the homeowner in the kitchen on weekends as indicated in the corresponding historical proximity records for the mobile station as shown in proximity table 320 in FIG. 3B at rows 322E-G multiple spikes in overhead at three of the six proximity transitions 334G-L are required to accommodate the homeowner's communication requirements.

Figures 4A, 4B:
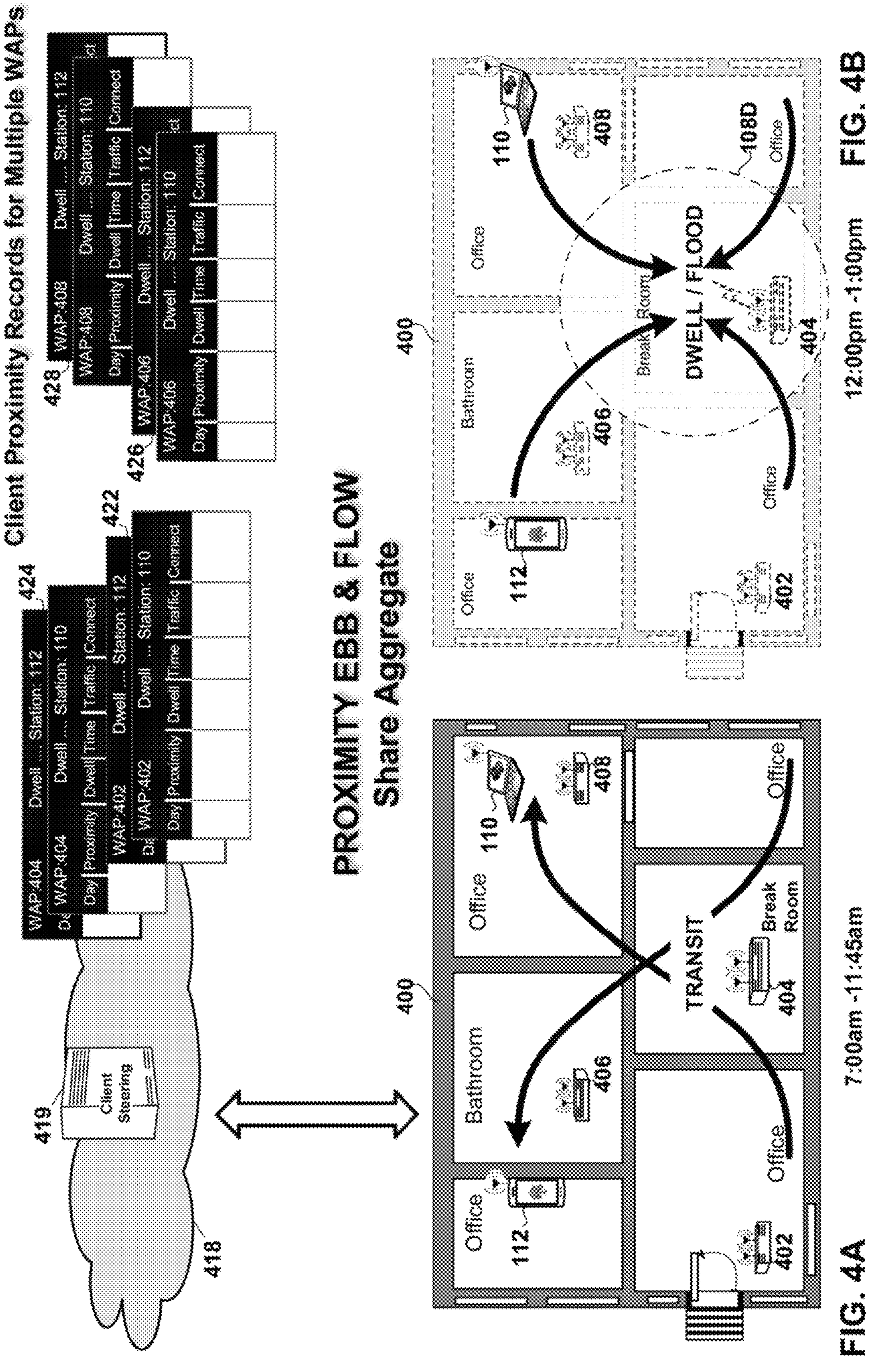
FIGS. 4A-B are system views of an alternate embodiment of the invention in which wireless connectivity determinations between multiple WLAN are made with shared temporal proximity data.

FIGS. 4A-B are system views of an alternate embodiment of the invention in which wireless connectivity determinations between multiple WLAN are made with shared temporal proximity data.

FIG. 4A shows a plan view of an office between 7 am and 11:45 am in the morning. The Office includes an enterprise WLAN formed by WAPs 402, 404, 406, and 408. Mobile stations, e.g. station 110 and station 112 are shown along with the proximity path they follow during the morning, characterized by quick transition through the break room to reach a corresponding one of the offices in the back of the building. Each WAP accumulates proximity records for each station, which are aggregated and correlated by the "cloud" 418, and specifically by a telco or ISP, which has a remote server capable of client steering of the connectivity between the mobile stations and the WAP's based on the predicted client behavior exhibited by proximity records 422-428. The predicted quick transit through the break room at this time of day, as indicated in the proximity records, is used by the remote server, to avoid association of the clients/stations with the WAP 404 in the break room in the morning, thus avoiding unnecessary spikes in network overhead resulting from spontaneous association and disassociation from WAP 404 at this time of day.

FIG. 4B shows a plan view of the office 400 between 12 μm and 1 μm during lunch time. The predicted long dwell times, e.g. 1 hour, in the break room at this time of day coupled with the high occupancy, as indicated in the proximity records, is used by the remote server, to anticipate the flood of association requests by the clients/stations with the WAP 404 in the break room at lunch time.

FIGS. 5A-D are hardware block diagrams of embodiments of respectively the WAP and proximity, dwell time, and prediction circuits of the client steering circuit which is part of the WAP. The WAP may have one or more antenna. The WAP 402 is shown with a MIMO pair of antenna 559A-B for supporting a wireless local area network (WLAN) which provides associated stations, access to the Internet 502. In an embodiment of the invention the WAP provides the client steering functions on its own. In an embodiment of the invention the WAP is also communicatively coupled, via the shared broadband connection, to the remote cloud 418 and specifically to the remote server provided by the ISP or Telco 419 which handles portions of the client steering functions.

The WAP in this embodiment of the invention is identified as a 2×2 multiple-input multiple-output (MIMO) WAP supporting as many as 2 discrete communication streams over two antennas 559A-B. The WAP couples to the Internet 502 via an integral Ethernet medium access control (EMAC) interface 519 over a cable, fiber, or digital subscriber line (DSL) backbone connection. A packet bus 518 couples the EMAC to the MIMO WiFi baseband 526, and AFE-RF stages 528.

In the baseband portion 526 wireless communications transmitted to or received from each user/station are processed. The baseband portion is dynamically configurable to support SU-MIMO or MU-MIMO transmission to MU groups of two or more users/stations. The AFE and RF portion 528 handle the upconversion on each of transmit paths and wireless transmission initiated in the baseband. The RF portion also handles the downconversion of the signals received on the receive paths and passes them for further processing to the baseband.

TRANSMISSION: The transmit path/chain includes the following discrete and shared components. The WiFi medium access control (WMAC) component 530 includes: hardware queues 532 for each downlink and uplink communication stream; encryption and decryption circuits 534 for encrypting and decrypting the downlink and uplink communication streams; medium access circuit 536 for making the clear channel assessment (CCA), and making exponential random backoff and re-transmission decisions; and a packet processor circuit 538 for packet processing of the communication streams. The WMAC component has read access to a node table 539 which lists each node/station on the WLAN, the station's capabilities, the corresponding encryption key, and the priority associated with its communication traffic.

Each sounding or data packet for wireless transmission on the transmit path components to one or more stations is framed in the framer 540. Next each stream is encoded and scrambled in the encoder and scrambler 542 followed by interleaving and mapping in a corresponding one of the interleaver mappers 544A-B. Next all transmissions are spatially mapped with a spatial mapping matrix (SMM) 546 in the spatial mapper 548. The spatially mapped streams from the spatial mapper are input to inverse discrete Fourier Transform (IDFT) components 550A-B for conversion from the frequency to the time domain and subsequent transmission in the AFT and RF stage.

Each IDFT is coupled to a corresponding one of the transmit path/chain components in the AFT RF stage 528 for wireless transmission on an associated one of MIMO antenna 559A-B. Specifically each IDFT couples to an associated one of the digital-to-analog converters (DAC) 552A-B for converting the digital transmission to analog, upconverters 554A-B, coupled to a common voltage controlled oscillator (VCO) 566 for upconverting the transmission to the appropriate center frequency of the selected channel(s), filters 556A-B e.g. bandpass filters for controlling the bandwidth of the transmission, and power amplifiers 558A-B for setting the transmit power level of the transmission on the MIMO antenna 559A-B.

RECEPTION: The receive path/chain includes the following discrete and shared components. Received communications on the WAP's array of MIMO antenna are subject to RF processing including downconversion in the AFE-RF stage 528. There are two receive paths each including the following discrete and shared components: low noise amplifiers (LNA) 560A-B for amplifying the received signal under control of an analog gain control (AGC) for setting the amount by which the received signal is amplified, filters 564A-B for bandpass filtering the received signals, downconverters 568A-B coupled to the VCO 566 for downconverting the received signals, analog-to-digital converters (ADC) 570A-B for digitizing the downconverted signals.

The digital output from each ADC is passed to a corresponding one of the discrete Fourier transform (DFT) components 572A-B in the baseband portion 526 of the WiFi stage for conversion from the time to the frequency domain.

Receive processing in the baseband stage includes the following sha1red and discrete components including: an equalizer 574 to mitigate channel impairments which is coupled to the output of the DFTs 572A-B. The received streams at the output of the equalizer are subject to demapping and deinterleaving in a corresponding number of the demapper/deinterleavers 576A-B. Next the received stream (s) are decoded and descrambled in the decoder and descrambler component 578, followed by de-framing in the deframer 580. The received communication is then passed to the WMAC component 530 where it is decrypted with the decryption circuit 534 and placed in the appropriate upstream hardware queue 532 for upload to the Internet 502.

The WAP also includes a client steering circuit 504. The client steering circuit couples to the aforesaid plurality of components which make up the transmit and receive paths. The client steering circuit includes: a proximity circuit 506, a dwell time circuit 508, and a connectivity circuit 510. The client steering circuit couples to non-volatile memory or storage 520.

The proximity circuit 506 couples to the plurality of components which make up the transmit and receive path to determine the proximity of each associated and unassociated station. This may be accomplished by monitoring the received signal strength indicator (RSSI) of each station. That determination may alternately be based on a report from a station, responsive to an IEEE 802.11k beacon report request from the subject WAP. That determination may alternately be determined collaboratively with the neighboring WAP that a station has associated or disassociated with the neighboring WAP. The determination may alternately be made based on sniffing of packets between the station and a neighboring WAP as "sniffed" by the subject WAP. As shown in greater detail in FIG. 5B the proximity circuit may include an RSSI monitor 506B, a station identifier 506C and a transition detector 506D. The RSSI monitor couples 506A to the AGC 562, and the station identifier 506C couples to the WMAC circuit 530 to monitor the RSSI for each identified station and the transition detector 506D determines when a significant transition, above a threshold level, occurs in the RSSI, e.g. either a decrease or an increase, and signals a proximity transition to the dwell time and connectivity circuits.

The dwell time circuit 508 couples to the proximity circuit and determines the dwell time at any proximity level in between proximity transitions for each station. As shown in greater detail in FIG. 5C the dwell time circuit includes an interval timer 508A, a time and date generator 508B, and a proximity record generator 508C. As each proximity transition is detected the proximity record generator opens a new record and starts an interval timer, and closed a prior record including the dwell time determined by the interval timer along with the date and time from the time and date circuit in that record. These sequential records of each stations proximity to the WAP are stored in the non-volatile storage 520 by the proximity record generator and form historical records for each stations proximity over time along with corresponding connectivity options as determined by the connectivity circuit 510.

The connectivity circuit includes: a current connectivity circuit 512, a prediction circuit 514, an optional airtime circuit 516, and a connectivity selector 518. The current connectivity circuit couples to the plurality of components to determine the current connectivity options, e.g. band, channel, power, modulation and coding schema (MCS), number of streams, etc. for communicating with the station identified by the proximity circuit.

Figures 5A, 5B, 5C, 5D:
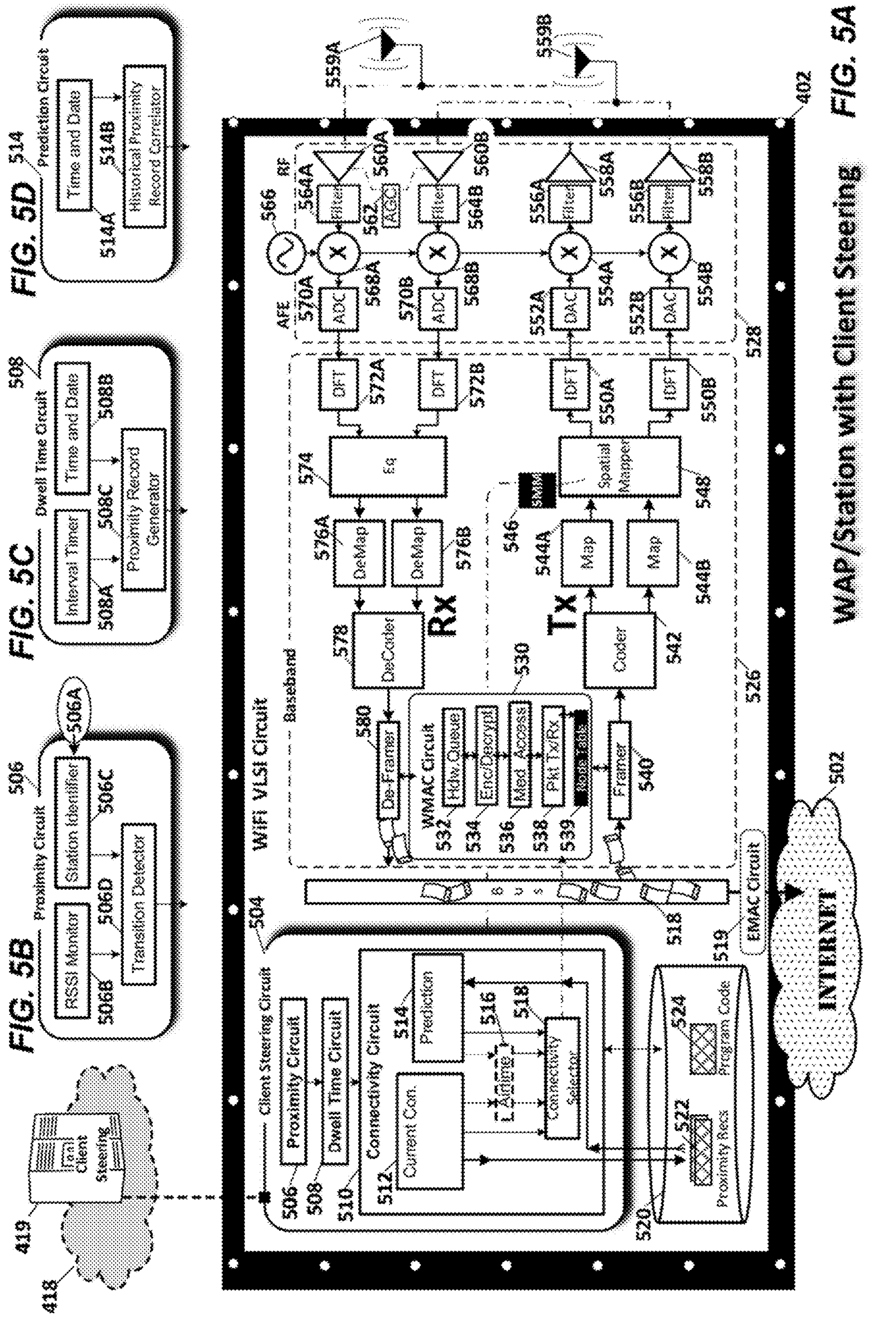
FIGS. 5A-D are hardware block diagrams of embodiments of respectively the WAP and proximity, dwell time, and prediction circuits of the client steering circuit which is part of the WAP. The WAP may have one or more antenna.

The prediction circuit 514 as shown in greater detail in FIG. 5D includes a time and date generator 514A and an historical proximity record correlator 514B. The prediction circuit couples to the plurality of components, and correlates the accumulated historical records for the identified station which match the identified station's current proximity to the WAP with remaining historical records for the identified station to determine which of the remaining records exhibits the highest probability of predicting the identified station's subsequent proximity, and the predicted connectivity options associated therewith. The prediction circuit selects connectivity options for the plurality of components to establish a communication link with the identified station utilizing a selected one of the predicted connectivity options, rather than the current connectivity options determined by the current connectivity circuit, when the corresponding probability identified therefore, exceeds a threshold level.

In an embodiment of the invention the prediction circuit further selects connectivity options for the plurality of components to establish a communication link with the identified station utilizing a selected one of the current connectivity options determined by the current connectivity circuit, rather than the predicted connectivity options, when the corresponding probability identified for the highest probability one of the remaining records, falls below a threshold level.

In an embodiment of the invention the prediction circuit further selects connectivity options for the plurality of components to establish a communication link with the identified station utilizing a selected one of the current connectivity options determined by the current connectivity circuit, rather than the predicted connectivity options, when the corresponding dwell time identified for the highest probability one of the remaining records, falls below a threshold level.

In an embodiment of the invention the optional airtime circuit 516 determines the airtime/traffic requirements of each station and updates each stations corresponding proximity record therewith.

The connectivity selector couples to the prediction circuit 514 and the current connectivity option circuit 512 and to the plurality of components on the transmit and receive path to establish each communication link between the WAP and associated station using the appropriate connectivity options as determined by the prediction circuit or the current connectivity circuit.

In an embodiment of the invention the current connectivity circuit determines current connectivity options for communicating with the station including at least one of: power, the selected communication channel, and a modulation and coding schema (MCS).

In an embodiment of the invention the client steering circuit is coupled to the remote computational device, e.g. server provided by the ISP or Telco 419. In an other embodiment of the invention, the WAP operates autonomously without connection to any client steering "cloud".

In an embodiment of the invention the non-volatile memory accumulates at least a portion of the historical records of each station's proximity to the WAP from a remote device coupled to neighboring WAPs.

Figures 6A, 6B, 6C:
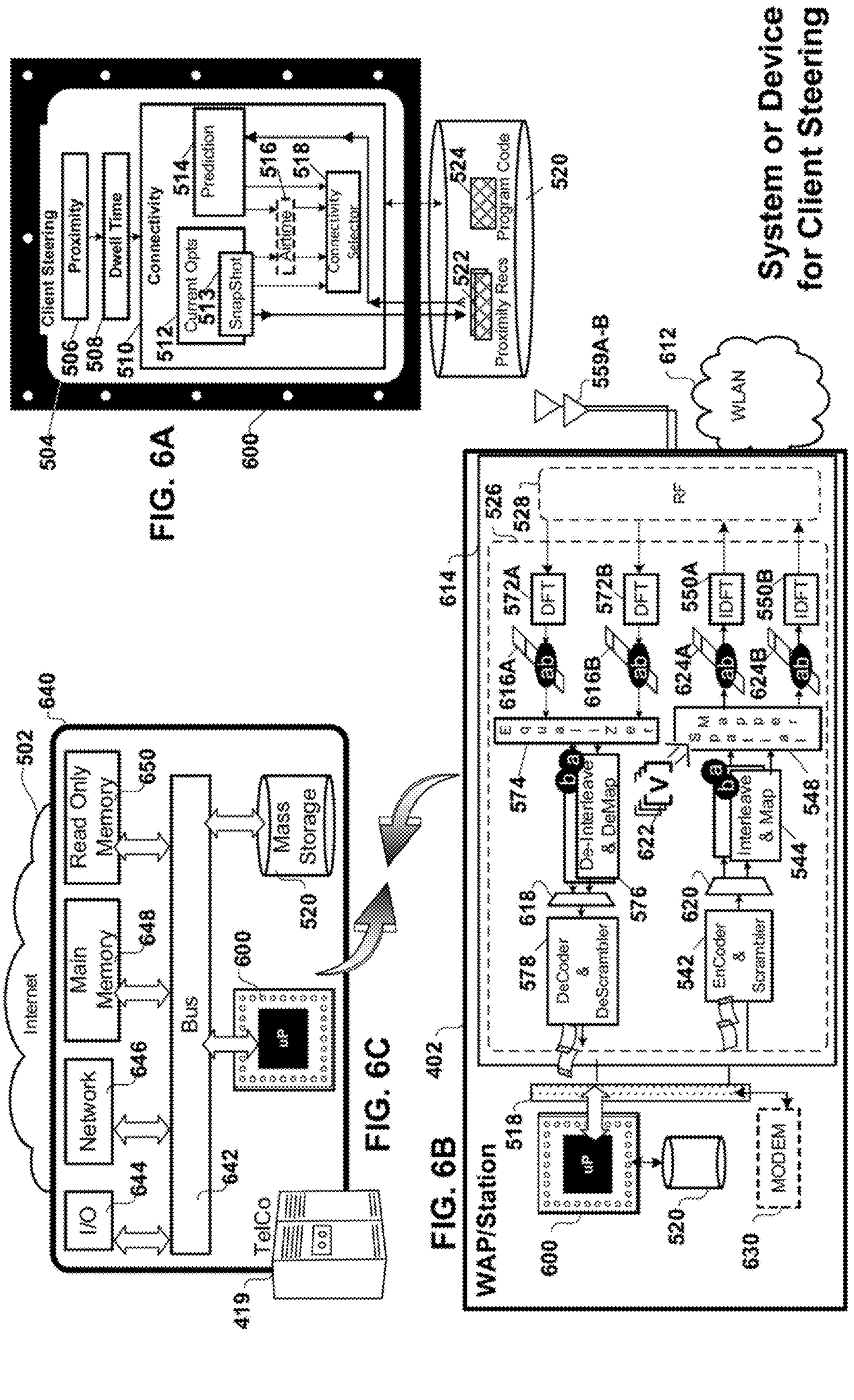
FIGS. 6A-C are hardware block diagrams of various devices configured to execute client steering within or between neighboring WLANs in accordance with various embodiments of the current invention.

FIG. 6A-C are hardware block diagrams of various devices configured to execute client steering within or between neighboring WLANs in accordance with various embodiments of the current invention.

FIG. 6A shows a processor 600 and memory element or storage module 520 configured to execute client steering program code 524 associated with a client steering circuit. The program code may be configured to run on a single device such as a WAP or station, or cooperatively on one or more host devices. The client steering component includes modules or circuit or combinations of both which perform the corresponding functions identified for the eponymous circuits shown and discussed above in connection with FIGS. 5A-D.

FIG. 6B shows the WAP 402 configured as a host device servicing a WLAN 612 which includes one or more associated wireless stations (not shown). The WAP supports discrete communications with a station or concurrent multiple user multiple-input multiple-output (MU-MIMO) communications with multiple stations. The WAP in this embodiment of the invention is identified as a 2×2 WAP supporting as many as 2 discrete communication streams "a", "b" over two antennas 559A-B. The WAP includes: the processor 600 and storage 520; the bus 518, a WLAN stage 614 including a base band stage 526, a radio frequency (RF) stage 528 and MIMO antennas 559A-B. The WAP RF stage supports one or more IEEE 802.11 wireless local area network (WLAN) protocols. The WAP also includes a modem 630 for coupling via copper or fiber to an Internet Service Provider (ISP) 419. The processor in addition to supporting the IEEE 802.11 WAP functionality also executes the program code which provides part or all of the client steering functionality as discussed above.

In the baseband stage 526 transmitted communications for a client/user/station are encoded and scrambled in encoder scrambler module 542 and de-multiplexed into two streams in demultiplexer 620. Each stream "a", "b" is subject to interleaving and constellation mapping in an associated interleaver mapper 544 and passed to the spatial mapper 548. The spatial mapper uses a beamsteering matrix 622 determined from a prior isotropic sounding of the link with a station (not shown) to steer subsequent communications thereto. The beamsteering matrix specifies specific phase and amplitude adjustments for the communications on each antenna designed to steering the outgoing communications toward the recipient station. There is a discrete beamsteering matrix for each of the OFDM tones or sub-channels. The combined streams "ab" are injected into each of the OFDM tones or sub-channels 624A-B of the inverse discrete Fourier Transform (IDFT) modules 550A-B respectively. Each IDFT module is coupled via associated upconversion circuitry in the RF stage 528 to an associated one of the pair of antenna 559A-B.

In the RF Stage 528 received communications "ab" on each of the two antenna 559A-B from the user/station (not shown) are downconverted and supplied as input to the baseband stage 526. In the baseband stage the received communications are then transformed from the time to the frequency domain in the discrete Fourier Transform (DFT) modules 572A-B from which they are output as discrete orthogonal frequency division multiplexed (OFDM) tones/sub-carriers/sub-channels 616A-B. All received streams are then subject to equalization in equalizer 574. Received steams "ab" are subject to de-interleaving and constellation demapping in associated deinterleaver demapper modules 576, followed by multiplexing in multiplexer 618. The received data "ab" is decoded and descrambled in decoder descrambler 578.

FIG. 6C shows a Telco or ISP 419 having a remote computational device, e.g. server 640 configured as a host device and coupled to the Internet 502. The server includes the processor 600 and storage 520; a bus 642, an input/output (I/O) module 644 for interfacing with a user, a network module 646 for coupling to a network, a main memory 648 for storing and executing program code 524 and data, a read only memory 650 for storing bootup program code. The processor in addition to supporting the server functionality also executes the program code which may provide selected portions of the client steering functionality as discussed above. In an embodiment of the invention the WAP 402 performs station monitoring identification, and proximity determinations and station connectivity, and the server 640 performs the accumulating, correlating, and predicting functions for download to the WAP or Station nodes. In another embodiment of the invention all client steering functionality resides on the WAP or station or both.

Figure 7:
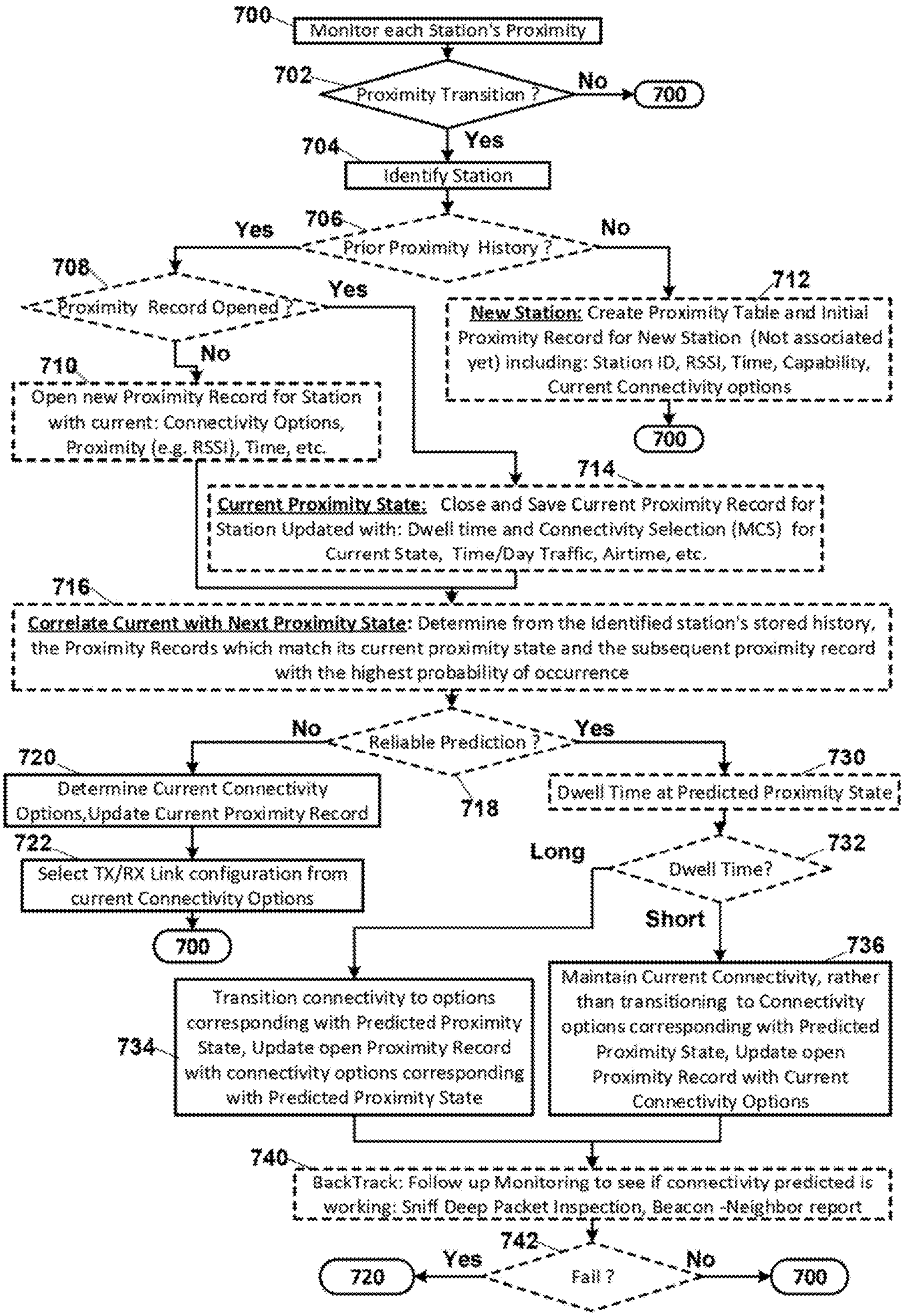
FIG. 7 is a process flow diagram of processes associated with client steering in accordance with an embodiment of the current invention.

FIG. 7 is a process flow diagram of processes associated with client steering in accordance with an embodiment of the current invention. Processes marked with a dashed border may be executed on either a wireless access point (WAP), or on a remote computational device such as a "cloud" server communicatively coupled to one or more WAPs, or collaboratively on both the WAP and the remote computational device without departing from the scope of the Claimed invention.

In process 700 the proximity of each station, associated and unassociated to the subject WAP is monitored. In decision process 702 a determination is made as to whether a proximity transition of one of the stations has taken place. That determination may be based on monitoring of a received signal strength indicator (RSSI) for each station. That determination may alternately be based on a report from a station, responsive to an IEEE 802.11k beacon report request from the subject WAP. That determination may alternately be determined collaboratively with the neighboring WAP that a station has associated or disassociated with the neighboring WAP. The determination may alternately be made based on sniffing of packets between the station and a neighboring WAP as "sniffed" by the subject WAP. That inspection may alternately be made based on deep packet inspection of packets that route from a repeater through the WAP. If there is a proximity transition, then control passes to process 704 in which the station making the proximity transition with respect to the subject WAP is identified. The station may be previously associated with the subject WAP or un-associated with the subject WAP without departing from the scope of the claimed invention. Next in decision process 706 a determination is made as to whether there is any prior proximity history for the station maintained by either or both the WAP and the remote computational device. If not then control passes to process 712 in which a proximity table and initial proximity record is created for the new station including: station ID, RSSI, Time of day and day of week, station capability, and current connectivity options such as: the communication band(s) supported and the IEEE 802.11 standards supported, as well as the number of antennas and streams supported in the case of a multiple-input multiple-output WAP and station. The proximity record may be stored on the subject WAP or passed to the remote computational device in the "cloud" for subsequent processing. Control then returns to process 700.

If alternately, in decision process 706 a determination is made that there is a prior proximity history for the identified station then control is passed to decision process 708 for a determination of whether or not there is an open proximity record for the identified station on either the WAP or the Cloud. If there is an opened proximity record for the identified station then control pases to process 714 in which the open record, i.e. the current record for that station is updated with dwell time at the proximity prior to the transition, the connectivity selection e.g. channel band and channel, and modulation and coding schema (MCS), number of streams time of day, traffic, airtime usage, etc. and the record is then closed and saved with the accumulating history of proximity records for the identified station on either the WAP or Cloud. Control is then passed to process 716.

If alternately, in decision process 708 a determination is made that there is not an opened proximity record, then in process 710 a new proximity record for the identified station is opened with the current, connectivity options, proximity, time of day and day of week, etc. Control is then passed to process 716.

In process 716 a correlation of the current connectivity state with the next proximity state is made. In an embodiment of the invention the correlation relies on a determination from the identified station's stored history of the proximity records. The accumulated historical records for the identified station which match the identified station's current proximity to the WAP are correlated with remaining historical records for the identified station to determine which of the remaining records exhibits the highest probability of predicting the identified station's subsequent proximity, and the predicted connectivity options associated therewith. Control is then passed to decision process 718 in which the reliability of the prediction, e.g. the magnitude of the probability corresponding therewith is evaluated. If the predicted probability is below a threshold level, indicating a lack of reliability, then control is passed to processes 720-722 in which current connectivity options are determined, the current proximity record is updated with those options, and a selected one of those options is used to configure the transmit and receive link with the identified station is established using the current connectivity options. The current connectivity options, e.g. band, channel, power, MCS, number of streams, etc. are determined using conventional techniques. Control then returns to process 700.

If alternately, in decision process 718 a determination is made that the predicted one of the remaining records is highly correlated, or reliable, then control passes to process 730. In process 730 the dwell time at the predicted proximity state is determined from the predicted one of the remaining records. Next in decision process 732 a determination is made as to whether the predicted dwell time is long enough to warrant the overhead associated with a change in connectivity, e.g. band 5 GHz to 2.4 GHz or MCS, or number of streams, etc. If it is not, i.e. if the predicted dwell time at the predicted proximity falls below a threshold level, e.g. is of short duration, then control passes to process 736. In process 736 the selected one of the current connectivity options is maintained, rather than transitioning to the connectivity options corresponding with the predicted proximity state. The opened proximity record is updated with the current connectivity options. Control is then passed to process 740. If alternately, in decision process 732 a determination is made that the predicted dwell time is long, e.g. above a threshold level, then control is passed to process 734. In process 734 a transition of the connectivity of the station to options corresponding with the predicted proximity state is warranted. This may include a change in communication band, channel, MCS, number of streams, or even a change in association from one WAP or repeater to another. The open proximity record is then updated with the connectivity options corresponding with the predicted proximity state in the highest probability subsequent record identified in the correlation performed in prior process 716. Control is then passed to process 740.

Then in process 740 follow up monitoring, a.k.a. backtrack, of the identified station is made to see if its connectivity is optimal. This monitoring could be of an associated station as shown in FIG. 2 that changed/transitioned connectivity options from 2.4 GHz band to the 5 GHz band. This monitoring could be of a station no longer associated with the subject WAP, having been disassociated therefrom in response to a predicted connectivity determination in process 734 for example. In this latter case the backtracking would include determining using packet sniffing and deep packet inspection, or collaboratively with the neighboring WAP or repeater, whether or not the identified station successfully associated with the predicted WAP or repeater. Next, in decision process 742 a determination is made as to whether the connectivity option from the corresponding one of processes 734 or 736 has failed. If it has not failed, then control returns to process 700. If the connectivity options selected has failed then control passes to process 720. In an embodiment of the invention the decision of the backtracking mechanism is used to update the corresponding proximity records.

EXAMPLES

Historical information: Historical conditions (performance, location, . . . of the client relative to each AP. Example: if client is close to a dual band AP most of the time, connect it to 5 GHz. Example: if client is at certain location most of the time, connect it to closest AP to that location. Historical load of each AP. Example: Avoid an AP which is not heavily loaded now but historically has been over loaded. Centralized information and decision making. All APs (radios) report statistics to centralized cloud engine. Example: Cloud engine knows the signals strength of client to all Aps and the network load of each AP. Central engine will analyze all data and derive a metric for each connectivity choice. Example: AP1<->client metric is XYZ, AP2<->client metric is ABC. Central engine compares metrics and decides on the connectivity point. Central engine will notify all Aps their required action (admit or reject client). When a new client tries to associate cloud will calculate metric for various connectivity options and decide which point of connectivity (AP/radio) is the best for client to connect to. Then, it will notify the selected AP to accept this new client and it will notify other Aps to reject association request from this particular client. Above process can repeat periodically even if there is no new client association request. Periodic iterations to check that all clients are connected to an appropriate AP, for example if a client move or load of an AP changes, cloud may decide to move clients around to optimize connectivity. In one embodiment, metric is based on signal strength of client to/from each AP (e.g. client connect to closest AP). In another embodiment, metric is based on matching client capabilities to AP capability (e.g. 11*ac* client connect to 5 GHz radio). In another embodiment, metric is based on AP load (e.g. client connect to the AP with lowest traffic or lowest number of clients). It can be current load or estimated load after client connection. In another embodiment, metric is based on environment around each AP (e.g. client connect to the AP with lowest interference). In another embodiment, metric is based on any combination of above parameters (e.g. 11*ac* client connect to 5 GHz AP only if load is low.

The components and processes disclosed herein may be implemented in a combination of software, circuits, hardware, and firmware, coupled to the WAP's existing transmit and receive path components, and without departing from the scope of the Claimed Invention.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A method comprising:

monitoring a received signal strength indicator (RSSI) for a wireless device to generate current proximity metrics, the wireless device being in communication with a wireless access point (WAP) on a first frequency band;

analyzing the current proximity metrics in view of a historical proximity record for the wireless device to predict a probability for a next future proximity state and a predicted dwell time; and in response to the predicted dwell time exceeding a threshold, selecting a connectivity option to change a communication link between the wireless device and the WAP to a second frequency band.

2. The method of claim 1, wherein selecting the connectivity option is further based on a probability for the next future proximity state being above a threshold probability level.

3. The method of claim 1, wherein the connectivity option includes a 2.4 GHz band or a 5 GHz band.

4. The method of claim 1, wherein the connectivity option includes at least one of a transmit power, a communication channel, a modulation and coding schema (MCS), and a number of streams.

5. The method of claim 1, further comprising detecting a proximity transition of the wireless device, the selecting the connectivity option further based on the detection of the proximity transition.

6. The method of claim 5, further comprising adding the current proximity metrics to the historical proximity record, the current proximity metrics including a current dwell time.

7. The method of claim 6, wherein the current proximity metrics added to the historical proximity record further includes a time of day and a day of week.

8. The method of claim 1, wherein the WAP and a second WAP form at least part of an enterprise wireless local area network (WLAN).

9. The method of claim 8, wherein the WAP and the second WAP are located in different rooms of a same building.

10. A method, comprising:

monitoring a received signal strength indicator (RSSI) for a wireless device to generate current proximity metrics, the wireless device being in communication with a wireless access point (WAP) on a first frequency band;

analyzing the current proximity metrics in view of a historical proximity record for the wireless device to predict a probability for a next future proximity state and a predicted dwell time; and in response to the predicted dwell time having a predicted duration shorter than a threshold time, selecting a connectivity option to maintain the communication with the WAP on the first frequency band instead of changing a communication link between the wireless device and the WAP to a second frequency band.

11. The method of claim 10, further comprising detecting a proximity transition of the wireless device, the selecting the connectivity option further based on the detection of the proximity transition.

12. The method of claim 11, further comprising adding the current proximity metrics to the historical proximity record, the current proximity metrics including a current dwell time.

13. The method of claim 12, wherein the current proximity metrics added to the historical proximity record further includes a time of day and a day of week.

14. The method of claim 11, wherein the WAP and a second WAP form at least part of an enterprise wireless local area network (WLAN).

15. The method of claim 11, wherein the WAP and a second WAP are located in different rooms of a same building.

16. One or more non-transitory computer-readable media containing instructions which, when executed by one or more processors, cause a system to perform operations, the operations comprising:

monitoring a received signal strength indicator (RSSI) for a wireless device to generate current proximity metrics, the wireless device being in communication with a wireless access point (WAP) on a first frequency band;

analyzing the current proximity metrics in view of a historical proximity record for the wireless device to predict a probability for a next future proximity state and a predicted dwell time; and in response to the predicted dwell time having a predicted duration shorter than a threshold time, selecting a connectivity option to change a communication link between the wireless device and the WAP to a second frequency band.

17. The non-transitory computer-readable media of claim 16, wherein selecting the connectivity option is further based on the probability for the next future proximity state being above a threshold level.

18. The non-transitory computer-readable media of claim 16, wherein the connectivity option includes at least one of a band, transmit power, a communication channel, a modulation and coding schema (MCS), and a number of streams.

19. The non-transitory computer-readable media of claim 16, wherein the operations further comprise detecting a proximity transition of the wireless device, the selecting the connectivity option further based on the detection of the proximity transition.

20. The non-transitory computer-readable media of claim 19, wherein the operations further comprise adding the current proximity metrics to the historical proximity record, the current proximity metrics including a current dwell time.

* * * * *